Sept. 4, 1962  H. N. YAZELL, JR., ETAL  3,052,327
FIXED RING BRAKE
Filed June 2, 1960

INVENTORS
HAROLD N. YAZELL, JR.
BY JESSE G. HAWLEY

J. B. Holden
ATTORNEY

United States Patent Office 3,052,327
Patented Sept. 4, 1962

3,052,327
FIXED RING BRAKE
Harold N. Yazell, Jr., Cuyahoga Falls, Ohio, and Jesse G. Hawley, Penn Yan, N.Y., assignors to The Goodyear Tire & Rubber Company, Akron, Ohio, a corporation of Ohio
Filed June 2, 1960, Ser. No. 33,463
5 Claims. (Cl. 188—76)

This invention relates to spot type brakes for applying brake pressure simultaneously to relatively small areas of radially opposite sides of a rotating brake member.

It is the general object of the invention to provide a simplified, and inexpensive spot type brake structure characterized by excellent braking action, smallness of space requirements, ease of service, and reduction of noise.

Another object of the invention is the provision of a brake combination wherein the rotating member is fixed to the wheel or other element to be braked, and the brake unit is radially splined to a fixed torque plate, the brake unit carrying a pair of friction buttons one adapted to engage with the radially outer surface of the rotating member and the other adapted to engage with the radially inner surface of the rotating member upon the application of fluid pressure.

Another object of the invention is to provide a lightweight, low cost brake combination wherein the brake pressure unit floats radially to produce a radially directed pinch upon opposite surfaces of a rotatably mounted, but axially and radially fixed, endless brake ring.

Another object of the invention is the provision of a brake structure of the character described wherein the brake ring can be attached to a wheel at the side of a tire retaining flange thereof to increase the radius of braking torque and allow reduction of brake piston diameter.

Another object of the invention is to provide a radially floating brake housing which can readily be removed for lining replacement.

The foregoing objects of the invention, and other objects which will become apparent as the description proceeds, are achieved by the provision in a brake combination of a stationary torque plate, a rotatable brake drum, a brake unit splined on the torque plate for radialy movement in relation to the axis of the rotatable brake drum, the brake unit including a C-clamp carrying a block of friction material adapted to engage with the radially outer surface of the brake drum, the brake unit slidably supporting a second block of friction material for radial movement into engagement with the radially inner surface of the brake drum, and means carried by the brake unit for forcibly engaging the blocks of friction material with the inner and outer faces of the brake drum.

For a better understanding of the invention reference should be had to the accompanying drawings wherein.

Figure 1:
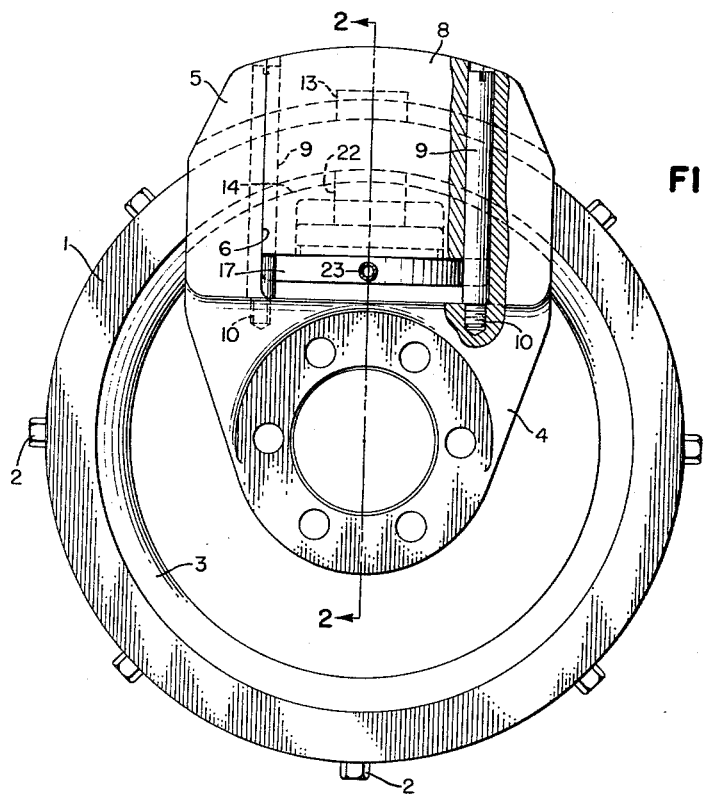
FIG. 1 is a side elevation of one embodiment of brake incorporating the principles of the invention.
Figure 3:
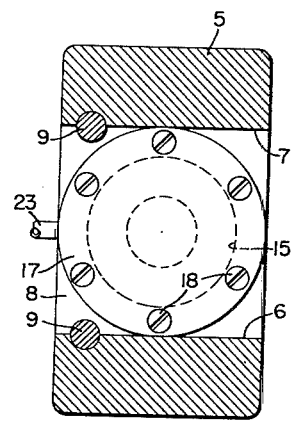
FIG. 3 is a cross-sectional view through the brake unit taken substantially on line 3—3 of FIG. 2.
Figure 2:
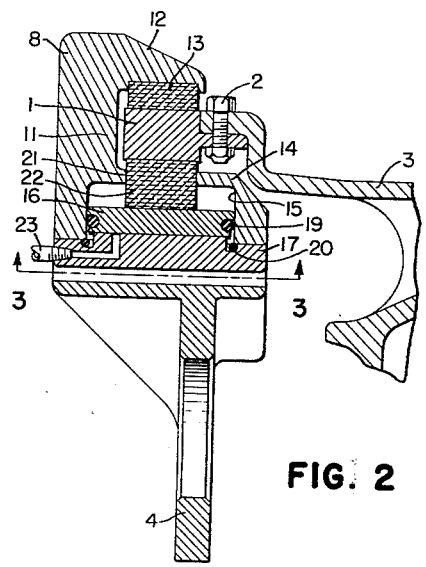
FIG. 2 is a vertical cross-sectional view of the brake of FIG. 1 taken substantially on line 2—2 thereof.
Figure 4:
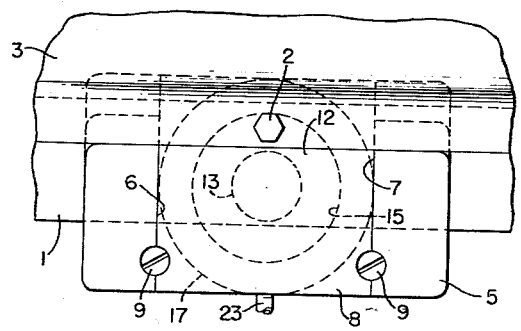
FIG. 4 is a fragmentary plan view of a portion of the brake unit shown in FIG. 1.

In the drawings, the numeral 1 indicates generally the rotary brake member, this taking the form of a radially thick endless metal ring which is adapted to be fixedly secured at one side, as by bolts 2, to a wheel 3 or other member to be braked. Note that the brake ring 1 can be mounted at the side of the tire bead retaining flange to provide a maximum radius brake torque arm so that the diameter of the brake piston, hereinafter described, can be kept to a minimum.

The stationary portion of the brake assembly includes a metal torque plate 4 adapted to be secured, for example, to a fixed axle (not shown) rotatably supporting the wheel 3. The torque plate 4 is formed integrally with a fork-like upper end 5 having opposed surfaces 6 and 7 slidably receiving for movement radially of the ring 1 a metal brake pressure unit indicated as a whole by the numeral 8.

The bifurcated end 5 of the torque plate 4 extends radially beyond or outward of the brake ring 1 and is formed L-shaped in vertical, axially-aligned section to receive the brake ring 1 with adequate clearance so that the parts do not rub in the rotary movement of the brake ring 1.

Spline forming pins 9 having threaded lower ends 10 secured in tapped openings in the torque plate 4 are positioned in bored or machined openings so that pressure unit 8 is mounted for radial floating movement on the torque plate. Various other arrangements to effect a mounting for radial movement only can be utilized between torque plate 4 and unit 8, as will be understood. This may be particularly true if the brake parts are die cast.

In any event, the removal of the spline pins 9 allows the unit 8 to be picked out in an axial direction from between opposed surfaces 6 and 7 of the torque plate 4 to facilitate relining, all without removing the wheel. Alternatively, removal of the wheel 3 from its axle allows unit 8 to be removed for relining without removal of splines 9.

The brake unit 8 at its radially outer end is formed with a C-clamp portion 11 surrounding brake ring 1, one arm 12 of C-clamp portion 11 carrying a button or block 13 of friction material. Both the block 13 and arm 12 are arcuately curved to extend parallel to the radially outer surface of the brake ring 1.

The inner arm 14 of C-clamp portion 11 is formed with a cylinder 15 slidably receiving a piston 16, and with the end of the cylinder closed by a head 17 held in place by screws 18 extending through the head into the unit. Suitable O-rings 19 and 20 may be utilized between the piston and cylinder and between the head and cylinder.

The end of the cylinder 15 adjacent the brake ring 1 is apertured at 21 to slidably receive a second button or block 22 of friction material adapted to engage with the inner surface of the brake ring 1 upon upward movement of the piston 16. Fluid under pressure is supplied between the cylinder head 17 and the piston 16 by a flexible conduit 23.

The outer surfaces of block 22 and the inner arm 14 of C-clamp portion 11 are arcuately shaped in side elevation to extend substantially parallel with the inner surface of brake ring 1 to provide proper clearances.

It is believed that the operation of the improved brake will be understood from the foregoing description. At all times the brake unit 8 floats radially in the torque plate 4, i.e., both during the time pressure is applied to piston 16 to pinch the ring 1 between buttons 13 and 22, and during the time no pressure is applied. Conventional return springs or automatic wear adjustment means may be incorporated in the brake assembly, but usually for purposes of economy these are not included.

By spline mounting the brake unit and fixing the brake ring, the entire brake assembly is less noisy, and is more free from clicking or chatter than is a brake assembly wherein the brake housing is fixed and the brake disc is splined to a wheel, for example. The brake assembly has a maximum radius torque arm for a given wheel allowing diameter of piston 16 to be kept to a minimum reducing displacement and pedal travel. Replacement of the blocks of friction material 13 and 22 is easy as heretofore described.

While a certain representative embodiment and details have been shown for the purpose of illustrating the invention, it will be apparent to those skilled in this art that various changes and modifications may be made therein without departing from the spirit or scope of the invention.

What is claimed is:

1. In combination, an axle, a wheel rotatable on the axle, a radially-thick, endless brake ring secured to the side of the wheel, a torque plate fixed to the axle and having a bifurcated radially directed end extending radially beyond the brake ring, the bifurcated end being formed with an arcuate, side-opening slot rotatably receiving the brake ring for rotary movement without engagement between the end and the ring, a brake unit, means splining the brake unit in the bifurcated end of the torque plate and free for radial movement only therein, said brake unit including an integral C-shaped clamp portion having one leg lying radially outside the brake ring, a block of friction material carried by said one leg and engaging with the radially outer surface of the brake ring, said clamp portion having a second leg lying radially inside the brake ring, a second block of friction material slidably supported in an opening through said second leg for movement against the radially inner surface of the brake ring, said brake unit having a closed cylindrical bore in alignment with and opening to said second block of friction material, a piston in the cylindrical bore and engaging with the second block of friction material, and means for supplying hydraulic fluid under pressure behind the piston, said blocks of friction material having an arcuate shape in axial view on those surfaces which engage the brake ring.

2. In combination, an axle, a wheel rotatable on the axle, an endless brake ring secured to the side of the wheel, a torque plate fixed to the axle and having a bifurcated radially directed end extending radially beyond the brake ring, the bifurcated end being formed with an arcuate, side-opening slot rotatably receiving the brake ring for rotary movement without engagement between the end and the ring, a brake unit, means splining the brake unit in the bifurcated end of the torque plate and free for radial movement only therein, said brake unit including an integral C-shaped clamp portion having one leg lying radially outside the brake ring, a block of friction material carried by said one leg and engaging with the radially outer surface of the brake ring, said clamp portion having a second leg lying radially inside the brake ring, a second block of friction material slidably supported in an opening through said second leg for movement against the radially inner surface of the brake ring, said brake unit having a closed cylindrical bore in alignment with and opening to said second block of friction material, a piston in the cylindrical bore and engaging with the second block of friction material, and means for supplying hydraulic fluid under pressure behind the piston.

3. In combination, an axle, a wheel rotatable on the axle, an endless brake ring secured to the side of the wheel, a torque plate fixed to the axle and having a radially directed end extending radially beyond the brake ring, the end being formed with an arcuate, side-opening slot rotatably receiving the brake ring for rotary movement without engagement between the end and the ring, a brake unit, means splining the brake unit to the end of the torque plate and free for radial movement only therein, said brake unit including an integral C-shaped clamp portion having one leg lying radially outside the brake ring, a block of friction material carried by said one leg and engaging with the radially outer surface of the brake ring, said clamp portion having a second leg lying radially inside the brake ring, a second block of friction material slidably supported in an opening through said second leg for movement against the radially inner surface of the brake ring, said brake unit having a closed cylindrical bore in alignment with and opening to said second block of friction material, a piston in the cylindrical bore and engaging with the second block of friction material, and means for supplying hydraulic fluid under pressure behind the piston.

4. In combination, an axle, a wheel rotatable on the axle, an endless brake ring secured to the side of the wheel, a torque plate fixed to the axle and having a radially directed end extending radially beyond the brake ring, the end being formed with an arcuate, side-opening slot rotatably receiving the brake ring for rotary movement without engagement between the end and the ring, a brake unit, means for splining the brake unit to the end of the torque plate and free for radial movement only therein, said brake unit including an integral C-shaped clamp portion having one leg lying to one radial side of the brake ring, a block of friction material carried by said one leg and engaging with a radial surface of the brake ring, said clamp portion having a second leg lying radially to the other side of the brake ring, a second block of friction material slidably supported in an opening through said second leg for movement against the said other surface of the brake ring, said brake unit having a closed cylindrical bore in alignment with and opening to said second block of friction material, a piston in the cylindrical bore and engaging with the second block of friction material, and means for supplying hydraulic fluid under pressure behind the piston.

5. In a brake, an axle, a wheel having bead seats for receiving a pneumatic tire and journalled on the axle, a torque plate secured to the axle, a ring having inner and outer surfaces parallel to the wheel axis and secured to the wheel adjacent the tire bead seat thereof, a brake unit, spline means mounting the unit on the torque plate for radial movement thereon, the brake unit including a C-clamp, a block of friction material carried in the C-clamp and adapted to radially engage with the outer surface of the ring, a second block of friction material slidably mounted in the C-clamp for radial movement into engagement with the inner surface of the ring, and hydraulic piston and cylinder means carried by the C-clamp for engaging the blocks of friction material with the inner and outer surfaces of the brake ring, said spline means being removable from the brake to allow axial removal of the brake unit and replacement of the blocks of friction material.

References Cited in the file of this patent

UNITED STATES PATENTS

| 1,901,759 | Maranville | Mar. 14, 1933 |
| 2,563,392 | Butler | Aug. 7, 1951 |

FOREIGN PATENTS

| 728,376 | Great Britain | Apr. 20, 1955 |